(12) United States Patent
Burdinski et al.

(10) Patent No.: US 9,518,139 B2
(45) Date of Patent: Dec. 13, 2016

(54) WATER-ABSORBING ELASTOMERIC MATERIAL

(75) Inventors: Dirk Burdinski, Essen (DE); Joyce Van Zanten, Waalre (NL); Lucas Johannes Anna Maria Beckers, Veldhoven (NL); Cornelis Petrus Hendriks, Eindhoven (NL); Willem Franke Pasveer, Dordrecht (NL); Nicholaas Petrus Willard, Valkenswaard (NL); Mareike Klee, Straelen (DE); Biju Kumar Sreedharan Nair, Veldhoven (NL); David W. Smith, Oakmont, PA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/127,314

(22) PCT Filed: Jun. 28, 2012

(86) PCT No.: PCT/IB2012/053291
§ 371 (c)(1),
(2), (4) Date: Dec. 18, 2013

(87) PCT Pub. No.: WO2013/001487
PCT Pub. Date: Jan. 3, 2013

(65) Prior Publication Data
US 2014/0113986 A1    Apr. 24, 2014

Related U.S. Application Data

(60) Provisional application No. 61/502,926, filed on Jun. 30, 2011, provisional application No. 61/586,886, filed on Jan. 16, 2012.

(51) Int. Cl.
| | | |
|---|---|---|
| *C08F 230/08* | (2006.01) | |
| *C08G 77/392* | (2006.01) | |
| *C08J 9/02* | (2006.01) | |
| *C08L 83/08* | (2006.01) | |
| *C08J 5/18* | (2006.01) | |
| *D01F 6/28* | (2006.01) | |
| *C08F 228/02* | (2006.01) | |
| *C09J 143/04* | (2006.01) | |
| *C08G 77/12* | (2006.01) | |

(52) U.S. Cl.
CPC .......... *C08F 230/08* (2013.01); *C08F 228/02* (2013.01); *C08G 77/392* (2013.01); *C08J 5/18* (2013.01); *C08J 9/02* (2013.01); *C08L 83/08* (2013.01); *C09J 143/04* (2013.01); *D01F 6/28* (2013.01); *C08G 77/12* (2013.01); *C08J 2383/08* (2013.01)

(58) Field of Classification Search
CPC .... C08F 228/02; C08F 230/08; C08G 77/392; C08G 77/12; C08J 5/18; C08J 9/02; C08J 2383/08; C08L 83/08; C09J 143/04; D01F 6/28
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 4,767,794 A | 8/1988 | Modic et al. | |
| 6,062,220 A | 5/2000 | Whitaker et al. | |
| 8,028,842 B2 * | 10/2011 | McGrath | B01D 61/025 210/490 |
| 2002/0160139 A1 | 10/2002 | Huang et al. | |
| 2006/0130842 A1 | 6/2006 | Kleman | |
| 2009/0044810 A1 | 2/2009 | Kwok et al. | |
| 2011/0294677 A1 * | 12/2011 | Beckers | B01L 3/502707 506/7 |
| 2014/0113986 A1 | 4/2014 | Burdinski et al. | |
| 2014/0123981 A1 | 5/2014 | Willard et al. | |
| 2014/0134416 A1 | 5/2014 | Burdinski et al. | |

FOREIGN PATENT DOCUMENTS

| | | |
|---|---|---|
| EP | 0054426 A2 | 6/1982 |
| EP | 0796876 * | 9/1997 |
| JP | 2006325688 | 12/2006 |
| WO | WO9957185 | 11/1999 |
| WO | WO02087645 | 11/2002 |
| WO | WO2007012140 | 2/2007 |

(Continued)

OTHER PUBLICATIONS

Webpage Cleanroomshop.Com, Sep. 3, 2010, pp. 1-4.

(Continued)

*Primary Examiner* — Irina S Zemel
(74) *Attorney, Agent, or Firm* — Michael W. Haas (57) ABSTRACT

This invention relates to a rubbery or elastomeric polymer material taking up more than 5% by weight of water and at most 500% by weight of water after immersion in demineralized water at room temperature for a sufficient time to reach saturation, comprising: (a) repeating units from one or more hydrophobic organic monomers, and (b) repeating units from one or more monomers (a) being modified with one or more hydrophilic side groups. The rubbery or elastomeric polymer material may be in the form of a sheet, a foam, a coating adapted for adhesion to a substrate, or a fiber. This invention also relates to processes, polymerizable compositions, and foaming compositions for producing such rubbery or elastomeric polymer materials.

5 Claims, 1 Drawing Sheet

(56) References Cited

FOREIGN PATENT DOCUMENTS

| WO | 2008070929 A1 | 6/2008 |
| WO | WO2010095105 | 8/2010 |
| WO | WO2010096467 | 8/2010 |

OTHER PUBLICATIONS

Webpage Choosing an Influenza Masks, "Pandemic Flue Preparation kits and Hazardous Drugs Spill Kits", Oct. 7, 2010, 1 page.
Webpage How the Aegis Microbe Shield Antimicrobial Kills Germs, Our Performance Fabric and The Microbe Shield Technology, Sep. 3, 2010, pp. 2-3.
Barannikov et al, "Molecular Complexes of Crown Ethers in Crystals and Solutions", Russian Journal of Coordination Chemistry, vol. 28, No. 3, 2002, pp. 153-162.
Steed, "First- and Second-Sphere Coordination Chemistry of Alkali Metal Crown Ether Complexes", Coordination Chemistry Reviews, vol. 215, 2001, pp. 171-221.
Creaven et al, "Coordination Chemistry of Calix[4]Arene Derivatives With Lower Rim Functionalisation and Their Appilcation", Coordination Chemistry Reviews, vol. 253, 2009, pp. 893-962.
Silicones, XP007918236, Encyclopedia of Polymer Science and Technology, vol. 11, 2003, pp. 765-841.
Schneider et al, "Selectivity in Supramolecular Hosto-Guest Complexes", Chemical Society Reviews, vol. 37, 2008, pp. 263-277.

\* cited by examiner

WATER-ABSORBING ELASTOMERIC MATERIAL

CROSS-REFERENCE TO PRIOR APPLICATIONS

This application is the U.S. National Phase application under 35 U.S.C. §371 of International Application Serial No. PCT/IB2012/053291, filed on Jun. 28, 2012, which claims the benefit of U.S. Provisional Application Ser. No. 61/586,886, filed on Jan. 16, 2012 and 61/502,926, filed on Jun. 30, 2011. These applications are hereby incorporated by reference herein.

FIELD OF THE INVENTION

The present invention relates to hydrophilic rubber materials and hydrophilic elastomeric materials, in particular hydrophilic silicone-based rubber materials, having high water uptake capacity. The present invention also relates to water-absorbing rubbery or elastomeric polymer materials being in the form of a sheet, or a coating adapted to be applied to a substrate, or a foam, or a fiber.

BACKGROUND OF THE INVENTION

Major industrial methods to produce silicone rubbers are:
the peroxide cross-linking of vinyl containing silicone prepolymers,
the tin salt catalyst induced cross-linking of silanol containing silicone prepolymers and
the platinum salt induced crosslinking of vinyl and SiH containing silicone prepolymers.

The first two methods do not give medical grade silicone rubbers as small amounts of cross-linking chemicals and reaction products are still present in the rubber. These residues are no problem for non medical applications. The third method, the platinum salt catalyzed cross-linking, is the preferred method to obtain medical grade silicone rubbers.

The molecular design and synthesis of hydrophilic silicone materials is a relatively unexplored area. Still, some hydrophilic silicone materials have been disclosed in the known prior art. For example, patent application US2002/0160139 discloses a surface modified polymer including a surface that is covalently bonded to a surface modifying compound. Formation of the covalent bond between the polymer and the surface modifying compound is achieved by a reaction between an intrinsic functional group that is present in the polymer and the functional group of the surface modifying compound. By using a polymer having an intrinsic functional group, a separate surface activation step is avoided. Thus, the material has a hydrophilic surface while the bulk of the material remains hydrophobic. Accordingly, this material does not allow for the uptake of moisture through the material and moisture can thus not be removed effectively.

WO 2010/095105 discloses, for use in a microfluidic system, a rubber material comprising polar side groups whereby each of the side groups is linked with the polymer chain of said rubber material via a linker comprising at least 6 atoms. The polar side groups may be ionic side groups such as —SO3-. For instance the material may be a silicone rubber modified with 15-20 w % sodium alkene $C_{14-16}$ sulfonate. The silicone rubber may have a chain length from 1000 to 10000 Si—O units, and the modified silicone rubber may be made by radical addition of ω-alkenylsulfonic acids to siloxane units present in the polysiloxane chain.

More generally, many commercial polymers are not skin friendly as they do not absorb water or sweat from the skin.

Introduction of an alpha-olefin sulfonate surfactant into these polymers may provide a copolymer with an increased hydrophilic character which can be used to increase its biocompatibility and its capacity to hold water. For the manufacture of skin-contact products, this is especially relevant to biocompatible polymers such as, but not limited to, silicones, polybutadiene, polybutadiene-containing polymers, polybutadiene-polyethylene oxides copolymers, poly(meth)acrylates, and isobutylene-ethylene glycol copolymers.

However alpha-olefin sulfonate surfactants, although having a vinyl functional group, do not easily mix with the monomer of commercial polymers like polyethylene (PE), polypropylene (PP), polybutadiene, polyisoprene, polystyrene (PS), polyacetonitrile (PAN), silicones, poly(meth)acrylates, polyacrylonitrile, acrylonitrile-butadiene-styrene copolymers (ABS) and styrene-acrylonitrile copolymers (SAN). This incompatibility can be due to differences in boiling points, making these non volatile surfactants nearly impossible to use in gas phase polymerizations. Even under liquid phase polymerization conditions, it is difficult to mix a hydrophilic surfactant containing a sulfonic acid salt with a hydrophobic monomer or pre-polymer. Only in a special case like the suspension polymerization of vinyl chloride in water, can the hydrophilic surfactant be dissolved in a part of the reaction mixture (water) and thus incorporated into the main polymer. However polyvinyl chloride is not regarded as a skin-compatible polymer.

In front of the above mentioned prior art, there is still a need for a material with hydrophilic properties for use as an aid in moisture control, in particular for manufacturing products with moisture control properties such as, but not limited to, skin-contact products or mucosa-contact products.

In order to manufacture rubber materials being modified with an alpha-olefin sulfonate surfactant, there is also a need in the art for facilitating the miscibility of said alpha-olefin sulfonate surfactant with hydrophobic organic monomers or pre-polymers under conventional liquid phase polymerization conditions.

There is also a need in the art for conveniently producing rubbery or elastomeric polymer materials with hydrophilic properties for use in non-medical applications wherein high water-uptake capacity is desirable. For instance, with respect to silicone rubbers, the production of silicone rubbers with hydrophilic properties should not be limited to the platinum salt catalyzed cross-linking method specified hereinabove.

SUMMARY OF THE INVENTION

It is a principal object of embodiments of the present invention to provide a hydrophilic polymer material, e.g. a hydrophilic rubber or elastomeric material, with improved moisture uptake properties, e.g. a hydrophilic silicone rubber material, which is capable of taking up more than 5% by weight of water, preferably more than 10% by weight of water, more preferably more than 20% by weight of water, most preferably more than 40% by weight of water, and up to 500% by weight, or up to 200%, or 250% by weight, or up to 120% by weight, of water after immersion in demineralized water at room temperature for a sufficient time such as 5 days or more to reach saturation. Such water-absorbing rubbery or elastomeric polymer materials, in particular hydrophilic silicone rubber materials, may be in the form of a sheet, or a coating adapted to be applied to a substrate, or a foam, or a fiber, or any other form suitable for including into a medical or non-medical device where significant water-absorbing properties are desirable.

It is a further and independent object of further embodiments of the present invention to provide hydrophilic polymer materials, e.g. hydrophilic rubber or elastomeric materials, other than a hydrophilic silicone rubber material. This may be achieved for example by providing a hydrophilic polyurethane. Hydrophilic polyurethanes can be made by coupling a diisocyanate monomer or pre-polymer with hydrophilic monomers or pre-polymers. Examples of such hydrophilic monomers or pre-polymers include, but are not limited to, glycerol, ethylene glycol derivatives, polyethylene glycol and other hydroxyl function-containing polyol compounds. The hydrophilic properties can be even further increased by coupling a hydrophilic polyurethane with another hydrophilic polymer which does not necessarily contain a hydroxyl group. Examples of such hydrophilic polymers include, but are not limited to: polyvinylpyrrolidones (usually with a number average molecular weight from 20,000 to 400,000), poly(hydroxyethyl methacrylates), polyethylene glycols (usually with a number average molecular weight from 200 to 10,000), polyvinyl alcohols (usually with a number average molecular weight from 10,000 to 150,000), polyacrylamides, alkali metal poly (meth)acrylates (such as, but not limited to, sodium polyacrylate, potassium polyacrylate, sodium polymethacrylate, potassium polymethacrylate), and mixtures thereof.

With respect to hydrophilic silicone rubber materials, there is no limitation upon the manufacturing method by which they may be obtained, that is any of the three crosslinking methods briefly mentioned above and further detailed hereinafter may be suitable, depending upon the medical or non-medical application for which the hydrophilic silicone rubber material is intended, and depending the form (e.g. sheet, coating, fiber or foam) in which the water-absorbing silicone rubber material is desired.

The peroxide cross-linking method can give non medical grade hydrophilic silicone rubbers by adding vinyl containing hydrophilic molecules, for example an ethylenically unsaturated (olefinic) soap such as an alpha-olefinic sulfonic acid sodium salt, to the silicone mixture. Other reactive groups suitable for this reaction are allyl, acrylic or methacrylic groups. The ethylenically unsaturated (olefinic) soap can directly be added to the mixture and will thus be incorporated into the silicone matrix by the radical cross-linking reaction, e.g. see scheme 1 showing a simplified non-limiting overview of the peroxide cross-linking of a vinyl-containing silicone prepolymer with vinyl containing hydrophilic molecules. In this scheme, $R_1$ and $R_3$ each designate residue groups of the peroxide used to initiate cross-linking $R_2$ is a hydrogen atom, an alkyl group or a trimethylsilyl group.

Scheme 1

Suitable peroxides ($R_1OOR_3$) for this crosslinking reaction include, but are not limited to, for instance dicumyl peroxide, bis(2,4-dichlorobenzoyl) peroxide or 2,5-bis-(tert.-butylperoxo)-2,5-dimethylhexane. As this cross-linking polymerization is based on radicals several hydrophilic or silicone containing molecules may be incorporated into the silicone matrix.

Non medical grade hydrophilic silicone rubbers can also be made by a tin catalyzed condensation polymerization but here the hydrophilic molecules need to contain a hydrolysable silane group. Suitable hydrolysable silanes preferably contain one or more alkoxy or acetoxy groups which are able to react in the silanol condensation reaction. As an example, a suitable molecule is 3-(trihydroxysilyl)-1-propanesulfonic acid (CAS 70942-24-4) for instance commercially available from Gelest Inc. (Morrisville, Pa., USA), but molecules with other hydrophilic groups such as trialkoxysilane terminated polyglycols are also possible. Scheme 2 below shows a simplified overview of the tin catalyzed cross linking of silanol containing silicone prepolymers with hydrophilic molecules with an alkoxy- or acetoxysilane group. In this scheme, $R_1$ is H or a hydrolysable group like an alkoxy or an acetoxy group.

philic) silicone-based rubber materials of the present invention are suitable for contact with the mucosa of a human.

The present invention also relates to polymerizable compositions comprising both hydrophobic and hydrophilic monomers that can be polymerized under liquid phase polymerization conditions, and to polymers and copolymers that can be obtained from such compositions. The present invention more specifically relates to biocompatible polymers and copolymers comprising both hydrophobic and hydrophilic monomer units. The hydrophilic monomer units can be incorporated in the main chain or as a side group of the silicone polymer matrix. Incorporation into the main chain is possible when the hydrophilic molecules contain two or more active groups which can react in the cross-linking reaction. Possible molecules are sulfonic acid salt with two or more vinylic groups or hydrophilic polymers with two or more side or terminal groups containing a double bond like an allyl group. A schematic overview of this reaction is given in scheme 3 showing the incorporation of hydrophilic molecules into the silicone rubber matrix main chain, wherein the hydrophilic molecule has two reactive groups that can participate in the platinum catalyzed crosslinking reaction, and wherein a suitable reactive group is an allyl group. Incorporation as a side group is possible when the hydrophilic molecule contains only one reactive group that can react in the cross-linking reaction.

The third method is the preferred method to make medical grade silicone rubbers but can also be used for non medical applications. The present invention more specifically relates to hydrophilic silicone-based rubber materials having such high water uptake capacity at room temperature that they can be used for manufacturing skin-contact products, in particular skin-contact products with a transpiration function. In other embodiments, the water-absorbing (hydro- Such a hydrophilic silicone rubber material may also be obtained by a process comprising the steps of:

providing a silicone precursor and a hydrophilic molecule or polymer;

polymerizing said silicone precursor in the presence of said hydrophilic molecule or polymer and in the optional presence of a solvent.

In this process the silicone precursor may or may not react with the hydrophilic polymer. In one embodiment of the present invention, a hydrophilic silicone-based rubber material comprises:

(a) dialkylsiloxane (preferably dimethylsiloxane) and/or arylsiloxane (preferably methylphenyl siloxane or diphenylsiloxane) repeating units, and (b) at least one modified dialkylsiloxane or modified arylsiloxane repeating unit wherein one alkyl or aryl group of said repeating unit is replaced with a hydrophilic side group, and is such that the total number of repeating units (a) and repeating units (b) is at least 5 and less than 1,000. The repeating units (a) form part of what is hereinafter called a "silicone precursor". The repeating units (a) may be of a single type (e.g. preferably dimethylsiloxane), or mixed types (e.g. dimethylsiloxane and diphenylsiloxane) in any proportions. In the latter case, they may be arranged randomly in the polymer chain, or they may be arranged in the form of block copolymers, for instance di-block copolymers or polydiphenylsiloxane-polydimethyl-siloxane-polydiphenyl-siloxane tri-block copolymers.

In a broader aspect, it is a principal object of other embodiments of the present invention to provide a rubber or elastomeric material taking up more than 5% by weight of water, preferably more than 10% by weight of water, more preferably more than 20% by weight of water, most preferably more than 40% by weight of water, and up to 500% by weight, or up to 200%, or 250% by weight, or up to 120% by weight of water after immersion in demineralized water at room temperature for a sufficient time such as 5 days or more to reach saturation, comprising:

(a) repeating units from one or more hydrophobic organic monomers, and (b) repeating units from one or more monomers (a) being modified with one or more hydrophilic side groups.

Said water-absorbing polymer material may be any rubbery or elastomeric polymer material, e.g. one wherein said hydrophobic organic monomer (a) is selected from the group consisting of butadiene, isoprene, dialkylsiloxanes, diarylsiloxanes, acrylic acid alkyl esters, acrylonitrile, chloroprene, fluorinated ethylene, mixtures of ethylene and vinyl acetate, mixtures of ethylene and one or more acrylic acid esters, and mixtures of ethylene with propylene and a diene. Said water-absorbing rubber materials may be in the form of a sheet, or a coating adapted to be applied to a substrate, or a foam, or a fiber, or any other form suitable for including into a medical or non-medical device where significant water-absorbing properties are desirable.

In one embodiment of the present invention, a rubbery polymer material may be one wherein said hydrophobic organic monomer (a) is a dialkylsiloxane or a diarylsiloxane, and wherein the total number of repeating units (a) and repeating units (b) is at least 5 and less than 1,000.

In one embodiment of the present invention, said polymer material may be one wherein said hydrophilic side groups are ionic side groups such as, but not limited to, C3-C28 alkylsulfonate groups in association with a cation. Said cation may be a monovalent cation selected from the group consisting of ammonium and alkali metal (Li, Na, K) cations, or a divalent cation selected from the group consisting of alkaline-earth metal cations (Ca, Mg). Other hydrophilic side groups can also comprise at least one moiety from ionic groups such as sulfate ($-OSO_3^-$), phosphate ($-OPO_3^{2-}$), phosphonate ($-PO_3^{2-}$), carboxylate ($-CO_2^-$), ammonium ($NR_1R_2R_3R_4^+$), or phosphonium ($PR_1R_2R_3R_4^+$) or combinations of these groups like in betaine ($R_1R_2R_3N^+-CR_4R_5-CO_2^-$) or sulfobetaine ($R_1R_2R_3N^+-CR_4R_5-SO_3^-$). It can also contain non ionic hydrophilic groups like alcohol groups such as hydroxy ($-OH$), glycols ($-OCH_2CH_2OH$), or sugar derivates, ethers such as glycol ether ($-(OCH_2CH_2-)_nOR$), amines ($-NR_1R_2$), amides ($-CONR_1R_2$), phosphine oxide ($-POR_1R_2$), aldehydes ($-CHO$) or esters ($-COOR$). Preferred counter ions comprise the before mentioned ammonium, alkali, earth alkali ions, $H^+$ or mixtures and for the positive hydrophilic side chains the preferred counter ions are the halogenides ($F^-$, $CL^-$, $Br^-$, $I^-$), hydroxide ($OH^-$), acetate ($CH_3COO^-$), sulfite ($SO_3^{2}$), sulfate ($SO_4^{2-}$), nitrite ($NO_2^-$), nitrate ($NO_3^-$), phosphate ($PO_4^{3-}$), perchlorate ($ClO_4^-$) or tetrafluorborate ($BF_4^-$) or mixture thereof.

In one embodiment of the present invention, said water-absorbing rubbery or elastomeric polymer material may be one wherein the repeating units (b) represent from 1% to 30% for instance from 2% to 25%, or from 3% to 20%, or from 5% to 15%, of the total number of repeating units (a) and repeating units (b). The proportion of repeating units (b) present in the water-absorbing rubbery or elastomeric polymer material may be appropriately selected by the skilled person depending upon parameters such as, but not limited to, the type of repeating units (b), the desired level and kinetics of water uptake, and the kind of medical device, health care device or non-medical device comprising said rubbery or elastomeric polymer material.

In one embodiment of the present invention, said water-absorbing rubbery or elastomeric polymer material may further comprise a detectable amount of a ligating compound or ligand. Said ligating compound or ligand may be a cyclic compound such as, but not limited to, a crown ether, a cryptand or a calixerene.

It is a principal object of other embodiments of the present invention to provide a polymerizable composition suitable for producing a water-absorbing rubbery or elastomeric polymer material such as recited herein-above, said composition comprising:

(a) one or more hydrophobic organic monomers or pre-polymers, (b) one or more hydrophilic monomers capable of modifying said hydrophobic organic monomers or pre-polymers (a) especially under liquid phase polymerization conditions, being a C3-C28 alkenyl sulfonate in association with a cation, and (c) a ligating compound or a solvent in an amount sufficient to increase solubility or miscibility of said hydrophilic monomers (b) in said hydrophobic organic monomers or pre-polymers (a) under polymerization conditions.

The hydrophobic organic monomers or pre-polymers (a) may be biocompatible in view of certain medicinal applications of the resulting polymer, but this is not a requirement of the present invention.

In further embodiments of this invention, the hydrophilic monomer (b):

may react, or associate with, said ligating compound or solvent (c), after reaction or association with said ligating compound or solvent (c), may be able to react with said hydrophobic organic monomers or pre-polymers (a) under liquid phase polymerization conditions, and/or may be incorporated into the polymer sequence resulting from liquid phase polymerization of said hydrophobic organic monomers or pre-polymers (a).

In one illustrative but non-limiting embodiment of the present invention, the hydrophilic side group of said repeating units (b) may be an alkylsulfonate group having from 3 to 28 (preferably 10 to 18, more preferably 12 to 16) carbon atoms in association with a cation. Said cation may be a monovalent cation selected from the group consisting of ammonium and alkali metal cations (such as, but not limited to, the cations of Li, Na, or K). Said cation may also be a divalent cation selected from the group consisting of alkaline-earth metal cations (such as the cations of Ca or Mg). Other hydrophilic side groups can also comprise at least one moiety from ionic groups such as sulfate ($-OSO_3^-$), phosphate ($-OPO_3^{2-}$), phosphonate ($-PO_3^{2-}$), carboxylate ($-CO_2^-$), ammonium ($NR_1R_2R_3R_4^+$), or phosphonium ($PR_1R_2R_3R_4^+$) or combinations of these groups like in betaine ($R_1R_2R_3N^+-CR_4R_5-CO_2^-$) or sulfobetaine ($R_1R_2R_3N^+-CR_4R_5-SO_3^-$). It can also contain non ionic hydrophilic groups like alcohol groups such as hydroxy ($-OH$), glycols ($-OCH_2CH_2OH$), or sugar derivates, ethers such as glycol ether ($-(OCH_2CH_2-)_nOR$), amines ($-NR_1R_2$), amides ($-CONR_1R_2$), phosphine oxide ($-POR_1R_2$), aldehydes ($-CHO$) or esters ($-COOR$). Preferred counter ions comprise the before mentioned ammonium, alkali, earth alkali ions, $H^+$ or mixtures and for the positive hydrophilic side chains the preferred counter ions are the halogenides ($F^-$, $CL^-$, $Br^-$, $I^-$), hydroxide ($OH^-$), acetate ($CH_3COO^-$), sulfite ($SO_3^{2-}$), sulfate ($SO_4^{2-}$), nitrite ($NO_2^-$), nitrate ($NO_3^-$), phosphate ($PO_4^{3-}$), perchlorate ($ClO_4^-$) or tetrafluorborate ($BF_4^-$) or mixture thereof.

In one embodiment of the present invention, the hydrophilic side group of said repeating units (b) may be derived from a hydrophilic polymer such as, but not limited to, a polymer selected from the group consisting of polyvinylpyrrolidones (usually with a number average molecular weight from 20,000 to 400,000), poly(hydroxyethyl methacrylates), polyethylene glycols (usually with a number average molecular weight from 200 to 10,000), polyvinyl alcohols (usually with a number average molecular weight from 10,000 to 150,000), polyacrylamides, alkali metal poly (meth)acrylates (such as, but not limited to, sodium polyacrylate, potassium polyacrylate, sodium polymethacrylate, potassium polymethacrylate), and mixtures thereof.

In one embodiment of the present invention, the water-absorbing rubbery polymer material may be a (partially) hydrophilic silicone-based rubber material wherein the molar ratio of the repeating units (a) to the repeating units (b) is at least 4.5, preferably at least 7, more preferably at least 9, most preferably at least 13. In one embodiment of the present invention, the polymer material may be a (partially) hydrophilic silicone-based rubber material wherein the molar ratio of the repeating units (a) to the repeating units (b) is at most 90, preferably at most preferably 40, most preferably at most 25.

In one embodiment of the present invention, the (partially) hydrophilic silicone-based rubber material may be a mixture of hydrophilic silicone rubber material and the hydrophilic molecule or polymer.

Figure 1:
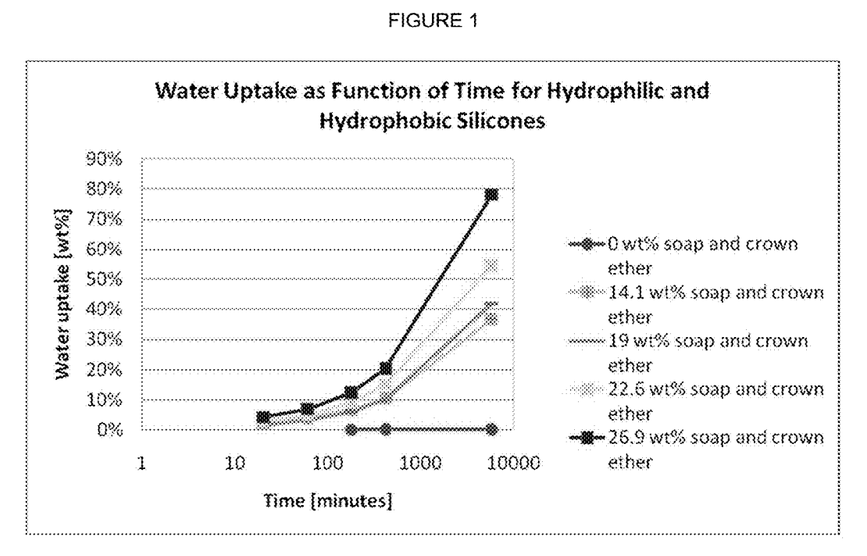
FIG. 1 and FIG. 2 show the water uptake of different hydrophilic silicone rubber materials (wherein the term "soap" is used as an abbreviation to designate sodium sulfonate groups) as a function of time, in comparison with a hydrophobic silicone rubber material without alkylsulfonate groups.
Figure 2:
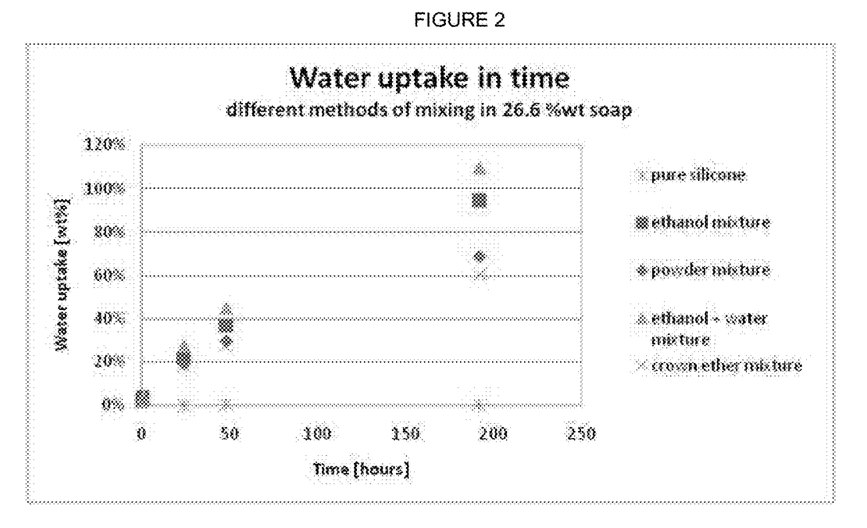

In one embodiment of the present invention, the (partially) hydrophilic silicone-based rubber material has an exceptionally high water uptake capacity, for instance it may take up more than 5% by weight (preferably more than 10% by weight, more preferably more than 15% by weight, most preferably more than 20% by weight) of water after immersion in demineralized water at room temperature for a sufficient time such as 5 days or more to reach saturation. The hydrophilic silicone-based rubber material of the invention may take up at most 500% by weight (for instance at most 250% by weight, or at most 200%, or at most 120% by weight, or at most 50% by weight, or at most 40% by weight) of water after immersion in demineralized water at room temperature for a sufficient time such as 5 days or more to reach saturation (as shown in FIGS. 1 and 2).

In one embodiment of the present invention, the polymer material may be a (partially) hydrophilic silicone-based rubber material further comprising residual traces or detectable amounts of a ligating compound or ligand that may be used during the process for its preparation. For instance when said hydrophilic side group is an alkylsulfonate having from 3 to 28 (preferably 10 to 18, more preferably 12 to 16) carbon atoms in association with a cation, said compound may be a cyclic ligand such as, but not limited to, a crown ether, a cryptand or a calixarene. Although there are effective procedures for removing a ligand such as a crown ether or a cryptand from a hydrophilic silicone-based rubber material of this invention, such as heating under vacuum, however it may be unnecessary to completely remove said ligand and residual but still detectable traces of the ligand may be admissible for medicinal applications. Methods for detecting and quantifying the presence of ligating compounds, such as crown ethers or cryptands, in a polymer material such as a (partially) hydrophilic silicone-based rubber material of the present invention are well known to the person skilled in the art.

In further embodiments of the present invention are provided several processes for making the novel water-absorbing silicone-based rubber materials described herein.

In one embodiment of the present invention, a first process for preparing a water-absorbing hydrophilic silicone-based rubber material comprises the steps of:
(a) providing a silicone precursor and one or more hydrophilic monomers (preferably a vinyl-terminated hydrophilic monomer) or polymers; and
(b) polymerizing said silicone precursor in the presence of said hydrophilic monomers or polymers, until obtaining a hydrophilic silicone-based rubber material which takes up more than 5% by weight (preferably more than 10% by weight, more preferably more than 15% by weight, most preferably more than 20% by weight) of water and at most 500% by weight (or at most 250% by weight, or up to 200%, or up to 120% by weight), of water after immersion in demineralized water at room temperature for a sufficient time such as 5 days or more to reach saturation.

In one embodiment of the present invention, a second process for preparing a water-absorbing hydrophilic silicone-based rubber material comprises the steps of:
(a) providing a silicone precursor and one or more hydrophilic ionic monomers (preferably a vinyl-terminated hydrophilic ionic monomer) or polymers;
(b) polymerizing said silicone precursor in the presence of said hydrophilic ionic monomers or polymers and in the further presence of a ligating compound or solvent.

In one embodiment of the present invention, a third process for preparing a water-absorbing hydrophilic silicone-based rubber material comprises the steps of:
(a) providing a silicone precursor having Si—O repeating units, wherein the number of Si—O repeating units in said silicone precursor is at least 5 and less than 1000,
(b) providing one or more hydrophilic monomers (preferably a vinyl-terminated hydrophilic monomer) or polymers; and
(c) polymerizing said silicone precursor in the presence of said hydrophilic monomers or polymers.

In one embodiment of each of the three above processes of the present invention, said silicone precursor may react with said hydrophilic monomers (preferably a vinyl-terminated hydrophilic monomer) or polymers. In particular said reaction may be via addition of a vinyl group onto a silicon-hydrogen bond, but this is not a requirement of the invention.

In one embodiment of each of the three above processes of the present invention, said silicone precursor bears reactive Si—H groups with a spacer group between said reactive Si—H groups, which preferably comprises at least 5 and less than 1,000 silicon atoms interspersed with oxygen atoms.

In one embodiment of each of the three above processes of the present invention, said hydrophilic monomer may be an alpha-olefin or alkenyl sulfonate having 3 to 28 (preferably 10 to 18, more preferably 12 to 16) carbon atoms in association with a cation. Said cation may be a monovalent cation selected from the group consisting of ammonium and alkali metal cations (such as, but not limited to, the cations of Li, Na, or K). Said cation may also be a divalent cation selected from the group consisting of alkaline-earth metal cations (such as the cations of Ca or Mg). Other hydrophilic side groups can also comprise at least one moiety from ionic groups such as sulfate (—$OSO_3^-$), phosphate (—$OPO_3^{2-}$), phosphonate (—$PO_3^{2-}$), carboxylate (—$CO_2^-$), ammonium ($NR_1R_2R_3R_4^+$), or phosphonium ($PR_1R_2R_3R_4^+$) or combinations of these groups like in betaine ($R_1R_2R_3N^+$—$CR_4R_5$—$CO_2^-$) or sulfobetaine ($R_1R_2R_3N^+$—$CR_4R_5$—$SO_3^-$). It can also contain non ionic hydrophilic groups like alcohol groups such as hydroxy (—OH), glycols (—$OCH_2CH_2OH$), or sugar derivates, ethers such as glycol ether (—($OCH_2CH_2$—)$_n$OR), amines (—$NR_1R_2$), amides (—$CONR_1R_2$), phosphine oxide (—$POR_1R_2$), aldehydes (—CHO) or esters (—COOR). Preferred counter ions comprise the before mentioned ammonium, alkali, earth alkali ions, $H^+$ or mixtures and for the positive hydrophilic side chains the preferred counter ions are the halogenides ($F^-$, $CL^-$, $Br^-$, $I^-$), hydroxide (OH), acetate ($CH_3COO^-$), sulfite ($SO_3^{2-}$), sulfate ($SO_4^{2-}$), nitrite ($NO_2^-$), nitrate ($NO_3^-$), phosphate ($PO_4^{3-}$), perchlorate ($ClO_4^-$) or tetrafluorborate ($BF_4^-$) or mixture thereof.

In one embodiment of each of the three above processes of the present invention, said hydrophilic polymer may be selected from the group consisting of polyvinylpyrrolidones (usually with a number average molecular weight from 20,000 to 400,000), poly(hydroxyethyl methacrylates), polyethylene glycols (usually with a number average molecular weight from 200 to 10,000), polyvinyl alcohols (usually with a number average molecular weight from 10,000 to 150,000), polyacrylamides, alkali metal poly(meth)acrylates (such as, but not limited to, sodium polyacrylate, potassium polyacrylate, sodium polymethacrylate, potassium polymethacrylate), and mixtures thereof.

In one embodiment of each of the three above processes of the present invention, said silicone precursor reacts with said hydrophilic monomer or polymer in the presence of a ligating compound or a solvent. The ligating compound may be a cyclic ligating compound such as, but not limited to, a crown ether, a cryptand or a calixarene, for instance a crown ether capable of dissolving the cation associated with the alpha-olefin or alkenyl sulfonate having 3 to 28 (preferably 10 to 18, more preferably 12 to 16) carbon atoms.

A suitable crown ether may depend upon the atomic size of the cation. In one embodiment of the present invention, the cation is a lithium ion and the crown ether is a 12-crown-4 crown ether. In one embodiment of the present invention, the cation is a sodium ion and the crown ether is a 15-crown-5 crown ether. In one embodiment of the present invention, the cation is a potassium ion and the crown ether is a 18-crown-6 crown ether.

In place of a ligating compound, a solvent may be used to assist dissolution of the alkenyl sulfonate into the siloxane precursor. In one embodiment of the present invention, the solvent has a very low boiling point below 100° C. In another embodiment of the present invention, the solvent may be a ketone (such as, but not limited to, acetone), another polar solvent (such as, but not limited to, chloroform), a low boiling alcohol (such as, but not limited to, ethanol) or a mixture of said low boiling alcohol with water. In another embodiment of the present invention, the solvent may have a higher boiling point, between 100 and 300 C, to have a more stable mixture during the total production process. This higher boiling solvent can be an aliphatic alcohol, such as but not limited to isopropanol, hexanol or decylalcohol, an aliphatic ether such as but not limited to an ethylene- or propylene-glycol ether or di- and trimers of ethylene or propylene glycol, a ketone like methylethylketone, methylpropylketone or cyclohexanone, a chlorinated solvent such as but not limited to trichloroethylene, tetrachloroethylene or (di)chlorobenzene or any another polar solvent.

In one embodiment of each of the three above processes of the present invention, the hydrophilic silicone-based rubber material comprises at least one material represented by the following structural formula:

R = Si(CH3)3 or H wherein n is from 3 to 28 (preferably 10 to 18, more preferably 12 to 16) and wherein the total number (m+o+1) of repeating units is at least 5 and less than 1,000, with n and o being integers independently selected from each other and preferably being at least 6. In the above structural formula, the terminal end groups R usually consist of Si(CH3)3 and/or hydrogen.

In one embodiment of the present invention, the hydrophilic silicone-based rubber material comprises at least one material represented by the above structural formula, wherein the molar ratio m/o is at least 4.5, preferably at least 7, more preferably at least 9, most preferably at least 13. In one embodiment of the present invention, the hydrophilic silicone-based rubber material comprises at least one material represented by the above structural formula, wherein the molar ratio m/o is at most 90, preferably at most preferably 40, most preferably at most 25.

In one embodiment of the present invention, a hydrophilic silicone material comprises a silicone precursor material, a sodium alpha-olefin sulfonate, and a crown ether mixing mediator that facilitates mixing of the sodium alpha-olefin sulfonate with the silicone precursor material. The silicone precursor material may be a commercial silicone elastomer material such as, but not limited to, Elastosil LR 3004/40 from Wacker Silicones (Germany). The sodium alpha-olefin sulfonate is also a commercially available product, or may be produced according to methods well known in the art. The crown ether may be a 15-crown-5 ether. In one embodiment of the present invention, the hydrophilic silicone material includes from 40 to 98.5% by weight of the silicone precursor material, from 1 to 30% by weight of the sodium alpha-olefin sulfonate, and up to 30% by weight of the mixing mediator, and it takes up from 1 to 85% by weight of water, or more than 10% by weight of water, more preferably more than 20% by weight of water, most preferably more than 40% by weight of water, and up to 500% by weight, or up to 200%, or 250% by weight, or up to 120% by weight, of water after immersion in demineralized water at room temperature for a sufficient time such as 5 days or more to reach saturation.

In a further embodiment of the present invention, a method for manufacturing a hydrophilic silicone material includes the steps of: mixing a sodium alpha-olefin sulfonate with a first component of a silicone precursor material and with a crown ether or solvent mixing mediator, adding a second silicone precursor B component, mixing again, and obtaining a hydrophilic silicone mixture. The method for manufacturing a hydrophilic silicone material of this invention includes standard production techniques with steps such as, but not limited to, casting or molding the hydrophilic silicone mixture, curing the hydrophilic silicone mixture, and obtaining the hydrophilic silicone material. The method for manufacturing a hydrophilic silicone material of this invention may further includes the steps of: mixing the sodium alpha-olefin sulfonate with silicone precursor material and with the mixing mediator. Also mixing of hydrophilic silicone and sodium alpha-olefin sulfonate without mediator is possible. The method for manufacturing a hydrophilic silicone material of this invention includes further the steps of: providing a commercial sodium alpha-olefin sulfonate, providing a commercial silicone elastomer as the silicone precursor material, and providing a 15-crown-5 ether as the mixing mediator. The method for manufacturing a hydrophilic silicone material includes further the step of performing the mixing at room temperature.

In a more general aspect, the present invention provides a process for preparing a water-absorbing rubbery or elastomeric polymer material, comprising the steps of:
providing one or more hydrophobic organic monomers,
providing one or more hydrophilic monomers or polymers, and
polymerizing said hydrophobic organic monomers in the presence of said hydrophilic monomers or polymers until obtaining a rubbery or elastomeric polymer material wherein repeating units from the one or more hydrophobic organic monomers are modified with hydrophilic groups from said one or more hydrophilic monomers or polymers, said rubbery or elastomeric polymer material taking up more than 5% by weight of water, preferably more than 10% by weight of water, more preferably more than 20% by weight of water, most preferably more than 40% by weight of water, and up to 500% by weight, or up to 200%, or 250% by weight, or up to 120% by weight, of water after immersion in demineralized water at room temperature for a sufficient time such as 5 days or more to reach saturation.

In a further embodiment of this general method of the present invention, polymerization occurs in the presence of a ligating compound or a solvent for said hydrophilic monomer or polymer. In one embodiment of the present invention said ligating compound is a crown ether, a cryptand or a calixarene such as described herein-above. In one embodiment of the present invention, the solvent has a very low boiling point. In another embodiment of the present invention, the solvent may be a ketone (such as, but not limited to, acetone), another polar solvent (such as, but not limited to, chloroform), a low boiling alcohol (such as, but not limited to, ethanol) or a mixture of said low boiling alcohol with water.

In a still further embodiment of the present invention, the hydrophilic silicone material is used as a component of a system in combination with a hydrophobic material such as, but not limited to, a hydrophobic silicone based material or a hydrophobic natural rubber material. At least a part of the hydrophilic material may be in contact with a moist surface such as skin, mucosa or another moist substrate, while the hydrophobic base material provides mechanical and dynamical stability of the system. The hydrophilic material allows for uptake of moisture and diffusion of moisture away from the moist surface. The moist surface may be the skin or a mucosa of a human being. In one embodiment of the invention, the hydrophobic base material forms a base layer and the hydrophilic material forms a top layer placed above the base layer. In another embodiment of the present invention, the hydrophilic material is mixed into the hydrophobic base material to form a composite mixture. In a further embodiment, a layer of hydrophobic base material is formed at an outside of the composite mixture, the layer is perforated forming apertures, and the apertures connect the hydrophilic material with the moist surface. In still another embodiment of the invention, the hydrophobic base material includes a plurality of holes positioned at an interface of the hydrophobic base material with the moist surface, the holes are filled with the hydrophilic material, and the hydrophilic material is in contact with the moist surface.

BRIEF DESCRIPTION OF THE DRAWINGS

The present invention will now be described, by way of example, with reference to the accompanying drawings, in which.

The exemplification set out herein illustrates exemplary embodiments of the invention, in one form, and such exemplification is not to be construed as limiting the scope of the invention in any manner.

DEFINITIONS

Hydrophobic materials are characterized by a water contact angle that is larger than that of hydrophilic materials. The larger the contact angle, the more hydrophobic is the material, the smaller the contact angle, the more hydrophilic is the material.

Examples of hydrophobic materials as used in the present invention are silicone rubbers, natural rubbers (latex), rubbers based on butadiene, isoprene, halogenated butadiene, perfluorinated rubbers (Viton) and acrylate rubbers, and mixtures thereof.

Hydrophilic materials are defined herein as polymers that allow the uptake and/or diffusion of water.

Examples of hydrophilic rubber materials include, but are not limited to, hydrophilic silicone rubbers with a crosslinking structure and/or a crosslinking density similar to that of hydrophobic silicone rubber materials. Hydrophilic silicones keep the silicone backbone structure but some of their hydrophobic methyl or phenyl groups are replaced with hydrophilic side groups.

DETAILED DESCRIPTION OF CERTAIN EMBODIMENTS

The present invention will be described with respect to particular embodiments and with reference to certain draw- ings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In an embodiment in accordance with the present invention, a novel composition for the preparation of hydrophilic silicone materials suitable for moisture control is provided. The synthesis of a suitable hydrophilic silicone according to this invention may be schematically described as follows:

A silicone precursor bearing reactive Si—H groups reacts with a hydrophilic monomer such as an alpha-olefin sulfonate, wherein:
  the values for n and m may range from 3 to 28, preferably from 10 to 18, and more preferably from 12 to 16, and
  wherein the value for o ranges from 5 to 1000.

The olefin component may be strongly hydrophilic, because it may include a polar, negatively charged head group (—$O_3S$) and a cation (Mn+) for charge balance. The mixing of the hydrophilic olefin component with the hydrophobic silicone precursor may be hampered by the difference in hydrophilicity. It may be particularly different to suspend the ion pair composed of the anionic head group and the cationic counter-ion in the hydrophobic matrix of the silicone precursor.

Adding a crown ether acting as a solubility- or mixing mediator may be highly effective and may allow for a simple, rapid, and highly reproducible synthesis of the desired hydrophilic silicone material. The choice of the most suitable crown ether may depend on the counter-cation used. For instance, the most efficient solubility mediator for dissolving the sodium ions in hydrophobic media is the 15-crown-5 ether, whereas the most suitable solubility mediator for dissolving potassium ions in hydrophobic media is the 18-crown-6 crown ether. The stabilization of metal ions in hydrophobic media by crown ethers, derivatives thereof, and related molecules, is well known in the art and has been described for instance in the following publications, which are incorporated herein by reference:

H. J. Schneider et al., Chemical Society Reviews (2008) 37, 263-277;

Barannikov, Russian Journal of Coordination Chemistry (2002) 28, 153-162; and

J. W. Steed, Coordination Chemistry Reviews (2001) 215, 171-221; and references therein.

In an exemplary embodiment in accordance with the present invention, mixing a commercial silicone precursor material with a sodium alpha-olefin sulfonate may be facilitated by the addition of a crown ether mixing mediator. Sodium alpha-olefin sulfonates, such as sodium $C_{12-14}$ olefin sulfonate, sodium $C_{14-16}$ olefin sulfonate, sodium $C_{14-18}$ olefin sulfonate, or sodium $C_{16-18}$ olefin sulfonate, are mixtures of long chain sulfonate salts prepared by the sulfonation of alpha olefins. The numbers indicate the average length of the carbon chains of the alpha olefins. Other ligating compounds that may be suitable to form an inclusion complex with the chosen counter ion may be used as an alternative to crown ethers. An example of such compounds are calix[4]arenes as described in B. S. Creaven et al., Coordination Chemistry Reviews (2009) 253, pp. 893-962, the content of which is incorporated herein by reference.

The water-absorbing rubbery or elastomeric polymer material of the present invention may be for use in the manufacture of a medical, health care or non-medical device with high water-uptake capacity, and may also be in the form of a coating adapted for adhesion to a substrate. The substrate may be a piece of another polymer material or a piece of metal such as aluminum or steel or other metal alloys as used in the building industry. The substrate may have any shape such as planar, curved, spherical or other, depending upon the type of device.

The water-absorbing rubbery or elastomeric polymer material of the present invention may be for use in the manufacture of a medical, non-medical device with high water-uptake capacity such a textile, and may also be in the form of a fiber or fibrous material. Manufacture of silicone fibers such as used as fillers in polyester pillows, in particular hollow silicone fibers with a linear mass density from 1.5 to 25 deniers, are well known to the skilled person.

The water-absorbing rubbery or elastomeric polymer material of the present invention may be for use in the manufacture of a medical, health care or non-medical device with high water-uptake capacity, and may also be in the form of a silicone-based foam, in which case a suitable foaming composition is required. This foaming composition may be defined for instance as comprising:
  one or more hydrophobic organic monomers selected from the group consisting of dialkylsiloxanes and diarylsiloxanes, or a silicone precursor, a monomer or polymer with one or more hydrophilic side groups, one or more hydroxylated components, from 1 to 250 ppm of a platinum catalyst, and optionally a foam density-reducing amino component.

Exemplary details of such foaming compositions are provided below.

A hydroxyl source is necessary to properly blow the foamable composition and may be in the form of one or more hydroxylated components. The source of hydroxyl may be selected from the group consisting of water, organic alcohols, silanols and mixtures thereof. Suitable silanols include any hydroxylated organosiloxane having an average of 1 to 2.5 silicon-bonded hydroxyl radicals per molecule. The silanols may be monomers, homopolymers, copolymers or mixtures thereof. Examples of suitable silanols include, but are not limited to, hydroxyl end-capped polydimethylsiloxane, hydroxyl end-capped dimethylsiloxane/phenylmethyl-siloxane copolymers, hydroxyl end-capped polymethyl-3,3,3-trifluoropropylsiloxane and diphenylmethylsilanol.

Organic alcohols suitable for use in the foaming compositions herein may be mono-alcohols or polyols, preferably having from 1 to 12 carbon atoms. Suitable organic alcohols include, but are not limited to, ethanol, propanol, butanol, lauryl alcohol, octyl alcohol, ethylene glycol, and benzyl alcohol. The hydroxyl source may react with hydrogen of the hydrophobic siloxane or silicone precursor to produce hydrogen gas. Water will react with hydrogen of the hydrophobic siloxane or silicone precursor to produce a hydroxyl function which can further react to produce additional gas and a cross-link site. Thus, where water is the hydroxyl source, additional gas will be generated as a benefit, but gassing after cure may occur. Silanol, due to good solubility in the composition, produces gas immediately but may lead to problems of premature gelation. Organic alcohols do not as easily react with the hydrogen function and thus are generally used in combination with silanol or water.

Depending on the hydroxyl source used, there should preferably be from 0.02 to 5 hydroxyl groups from the hydroxyl source for each silicone-bonded hydrogen atom in the hydrophobic siloxane or silicone precursor. Alternatively the hydroxylated component(s) should constitute not more than 2% by weight of the foamable composition of the present invention.

Suitable platinum catalysts are preferably soluble in the other ingredients of the foaming composition of the present invention. Although this is not a limiting feature of the present invention, they can be selected from the group of compounds having the formulae $(PtCl_2.Olefin)_2$ and $H(PtCl_3.Olefin)$, as described in U.S. Pat. No. 3,159,601. The olefin shown in these formulae is preferably an aliphatic alkene having from 2 to 8 carbon atoms, a cycloalkene having from 5 to 7 carbon atoms, or an alkenylaryl compound such as styrene. Specific suitable olefins include, but are not limited to, ethylene, propylene, butene, octene, cyclopentene, cyclohexene, and cycloheptene, A further suitable platinum catalyst for the foaming composition of the present invention is the platinum chloride cyclopropane complex $(PtCl_2C_3H_6)_2$ described in U.S. Pat. No. 3,159,662, or a complex formed from chloroplatinic acid with up to 2 moles per gram of platinum of a ligand selected from the group consisting of alcohols, ethers, aldehydes and mixtures thereof as described in U.S. Pat. No. 3,220,972.

Another suitable platinum catalyst (see U.S. Pat. No. 3,775,452) may be formed by reacting chloroplatinic acid containing 4 moles of water of hydration with tetramethyl-tetravinylcyclosiloxane in the presence of sodium bicarbonate in an ethanol solution.

Platinum catalysts such as illustrated above may be deposited on carriers such as silica gel or powdered charcoal.

An amino compound optionally suitable and effective to lower silicone foam density has the formula $NR_3$ wherein each R is independently selected from the group consisting of hydrogen, hydroxyl, $C_{1-18}$ alkyl, $C_{3-10}$ cycloalkyl, aryl (e.g. phenyl), and silyl., provided that at most one R may be hydroxy and provided that not all three R are hydrogen. Suitable amino compounds include, but are not limited to, hydroxylamines (e.g. diethyl hydroxylamine), primary, secondary and tertiary amines, and silylamines, for example tetramethylpiperidine, piperidine, N-methylmorpholine, N,N-dimethyl-ethylenediamine, N-methylpiperidine, N-hexylamine, tributylamine, dibutylamine, cyclohexylamine, di-n-hexylamine, triethylamine, benzylamine, dipropylamine, N-ethyl-phenylamine, tetramethyl-guanidine, hexamethyl-disilazane and N-methylmorpholine. Preferably the amino compound should be soluble in the foamable composition of the present invention.

Hydrophobic organic monomers suitable for the foaming compositions of the invention include, but are not limited to, polysiloxanes having not less than 5 alkylhydrogensiloxane units per molecule, polysiloxanes having not less than two silicon-bonded hydroxyl groups per molecule, fluorinated polyorganosiloxanes. Monomers or polymers with hydrophilic side groups suitable for the foaming compositions of the invention are as described previously with respect to embodiments of hydrophilic silicone materials.

Preferably, the foaming composition of the invention is provided in the form of two or more parts for admixture just prior to forming said composition, and each of said parts preferably has a similar viscosity as the other one at 25°

Reactions of components of the foaming compositions to generate hydrogen gas and to cure the mass through chain extension and crosslinking within the desired time span are dependent on presence of appropriate proportions of these components, especially the alkylhydrogen polysiloxane. Preferably this polysiloxane should have from 0.5% to 2.5% by weight of silicon-bonded hydrogen atoms.

These components of the foaming compositions are preferably liquids with appropriate functionality and chain length to achieve the target viscosity required for the composition, the amount of hydrogen evolution and the degree of chain extension and crosslinking required during curing of the composition. Suitable polysiloxanes having silicon-bonded hydroxyl groups are preferably silanol terminated polydiorganosiloxanes.

One may optionally include, in the foaming hydrophilic silicone composition of the invention, appropriate amounts of higher functional materials as crosslinking agents. Suitable crosslinking agents include materials having three or more functional, e.g. hydroxyl, groups per molecule. Preferred crosslinking agents include an alkoxysilane and/or a condensation product thereof capable of combining with three or more hydroxy polysiloxane molecules with release of the corresponding alcohol, e.g. methyl trimethoxysilane, n-propylortho-silicate or ethyl polysilicate.

The foaming compositions of the present invention may also include up to 10 percent, based on the weight of the hydrophobic siloxane, of $GSiO_{3/2}$ units wherein G is a residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule, as described in European Patent No. 179.598.

Within the above definitions of various embodiments of the foaming compositions of the present invention, one may obtain rubbery or elastomeric silicone materials being in the form of a foam with a foam density from 60 to 300 kg/m$^3$. For instance, high density foams from 150 to 300 kg/m$^3$, or low density foams from 60 to 150 kg/m$^3$ The rubbery or elastomeric polymer materials described herein, whether in the form of a bulk material, a coating adapted for adhesion to a substrate, or a foam, are useful in the manufacture of medical, health care and non-medical devices wherein high water-uptake capacity is desired. They may constitute the device itself, or a part thereof, preferably the part where water-uptake capacity is desired such as, in the case of a medical or health care device, the part in contact with the human body such as skin, mucosa or hair.

The following examples are purely illustrative of specific embodiments and should not be understood or construes as limiting the scope of the invention.

EXAMPLE 1

The commercial silicone elastomer Elastosil LR 3004/40 (Wacker Silicones, Germany) was used as silicone precursor material. The silicone precursor material is a two component system that was mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups.

The sodium $C_{12-14}$ alkenyl sulfonate commercially available from The Chemistry Store.com (Cayce, S.C., United States) was first mixed with the A component of the silicone precursor material. This mixing process is generally energy-demanding as the two components are viscous and do not mix well. Heating to 120° C. may therefore be needed.

To facilitate mixing of the commercial sodium $C_{12-14}$ alkenyl sulfonate with the silicone precursor A component, a crown ether (15-crown-5) was used (10% w/w with respect to the total amount of components A and B) as a mixing mediator. After addition of the crown ether, mixing was found to be straight forward and easily accomplished at room temperature.

More specifically, the commercial sodium alpha-olefin sulfonate (2 g) was mixed with 15-crown-5 (2 g) and silicone precursor A component (10 g). Mixing was performed at room temperature (SpeedMixer™ DAC 150 FVZ-K, Hauschild, Germany, twice 2 minutes, 3300 rpm). Then silicone precursor B component (11.4 g) was added and the obtained composition was mixed again (same mixer, twice 2 minutes, 3300 rpm). The resulting silicone composition was thus comprised of 84% by weight of the commercial silicone precursor material, 8% by weight of a commercial sodium alpha-olefin sulfonate, and 8% wt of the mixing mediator 15-crown-S.

Material samples were prepared by casting the above mixture onto the surface of a glass substrate and curing (30 minutes, 130° C.) under reduced pressure (<10 mbar). After curing, the water uptake of the silicone material (sample A) was compared with that of two other materials:

a material sample that was made with 20% by weight of the sodium alpha-olefin sulfonate without crown ether (sample B), and a material sample that was made of the commercial silicone elastomer Elastosil 3004/40 according to the instructions of the manufacturer (sample C).

After immersion of all three samples in demineralized water for 5 days, the Elastosil 3004/40 (sample C) had taken up 0.3% by weight water, the new silicone material comprising the sodium alpha-olefin sulfonate and the crown ether mixing mediator (sample A) had taken up 43% by weight water, whereas the sample B comprising only the sodium alpha-olefin sulfonate but no 15-crown-5 mixing mediator, had taken up 40% by weight water.

Water uptake (weight %) as a function of time of different amounts of sodium $C_{12-14}$ alkenyl sulfonate with equal amounts of 15-crown-5 in Elastosil LR3004/40 along the route described herein are shown in FIG. 1.

In the following examples 2-5 and 7, the amount of commercial sodium $C_{12-14}$ alkenyl sulfonate added to the amount of silicone precursors A+B is given in percentage and calculated along weight sodium $C_{12-14}$ alkenyl sulfonate/weight silicone A+B*100. The values for the percentage silicone precursor A+B given in the examples 2-5 are the values for 100%–amount sodium $C_{12-14}$ alkenyl sulfonate %.

EXAMPLE 2

The commercial silicone elastomer Elastosil LR 3004/40 (Wacker Silicones, Germany) was used as silicone precursor material. The silicone precursor material is a two component system that was mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups.

The sodium alpha-olefin sulfonate RCH=CH(CH2)nSO3Na (n=12-14) commercially available from The Chemistry Store.com (Cayce, S.C., United States) with a particle size above 400 μm was first mixed with the A component of the silicone precursor material. This mixing process is generally energy-demanding as the two components are viscous and do not mix well. Heating to 120° C. may therefore be needed.

To facilitate mixing of the commercial sodium alpha-olefin sulfonate with the silicone precursor A component, a crown ether (15-crown-5) acetone mixture was used as a mixing mediator. After addition of the crown ether and acetone mixing was found to be straight forward and easily accomplished at room temperature.

More specifically, the commercial sodium alpha-olefin sulfonate (12 g) was mixed in a first step with 15-crown-5 (7 g) and 7 g acetone. After this the silicone precursor A component (19 g) was added. Mixing was performed at room temperature (Speed Mixer™ DAC 150 FVZ-K, Hauschild, Germany, twice 2 minutes, 3300 rpm). The crown ether and acetone were removed in vacuum at 0.05 mbar, 90° C. Then silicone precursor B component (26.1 g) was added and the obtained composition was mixed again (same mixer, twice 2 minutes, 3300 rpm). The resulting silicone composition was thus comprised of 73.4% by weight of the commercial silicone precursor material, and 26.6% by weight of the commercial sodium alpha-olefin sulfonate.

Material samples were prepared by casting the above mixture onto the surface of a glass substrate and curing (30 minutes, 130° C.) under a nitrogen atmosphere.

EXAMPLE 3

In a further example the commercial silicone elastomer Elastosil LR 3004/40 (Wacker Silicones, Germany) was used as silicone precursor material. The silicone precursor material is a two component system that was mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups.

A commercial sodium alpha-olefin sulfonate RCH=CH(CH2)nSO3Na (n=12-14) from Stepan Company (Northfield, Ill., United States) was used. This very fine powder (particle sizes below 400 µm) was mixed with the A component of the silicone precursor material by speed mixing. More specifically, commercial sodium alpha-olefin sulfonate (12 g) was mixed with silicone precursor A component (19 g). Then silicone precursor B component (26.1 g) was added and the obtained composition was mixed. The resulting silicone composition was thus comprised of 73.4% by weight of the commercial silicone precursor material, and 26.6% by weight of a commercial sodium alpha-olefin sulfonate.

Material samples were prepared by pressure molding at 130° C.

EXAMPLE 4

In a further example the commercial silicone elastomer Elastosil LR 3004/40 (Wacker Silicones, Germany) was used as silicone precursor material. The silicone precursor material is a two component system that was mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups.

A commercial sodium alpha-olefin sulfonate RCH=CH(CH$_2$)nSO$_3$Na (n=12-14) from Stepan Company (Northfield, Ill., United States) was used. 12 g of this very fine powder (particle sizes below 400 µm) was mixed with 7 g ethanol. Then 19 g of the A component of the silicone precursor material added and mixing was carried out with a speed mixer. After mixing the ethanol was removed under vacuum at 60° C. Then silicone precursor B component (26.1 g) was added and the obtained composition was mixed. The resulting silicone composition was thus comprised of 73.4% by weight of the commercial silicone precursor material, and 26.6% by weight of a commercial sodium alpha-olefin sulfonate.

Material samples were prepared by pressure molding at 130° C.

EXAMPLE 5

In a further example the commercial silicone elastomer Elastosil LR 3004/40 (Wacker Silicones, Germany) was used as silicone precursor material. The silicone precursor material is a two component system that was mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups.

A commercial sodium alpha-olefin sulfonate RCH=CH(CH$_2$)nSO$_3$Na (n=12-14) from Stepan Company (Northfield, Ill., United States) was used. 12 g of this very fine powder (particle sizes below 400 µm) was mixed with 7 g of an ethanol water mixture (50/50% by volume). Then 19 g of the A component of the silicone precursor material added and mixing was carried out with a speed mixer. After mixing the ethanol was removed under vacuum at 90° C. Then silicone precursor B component (26.1 g) was added and the obtained composition was mixed. The resulting silicone composition was thus comprised of 73.4% by weight of the commercial silicone precursor material, and 26.6% by weight of a commercial sodium alpha-olefin sulfonate.

Material samples were prepared by pressure molding at 130° C.

Water uptake (weight %) as a function of time of different mixing methods of sodium C12-14 alkenyl sulfonate with Elastosil LR3004/40 along the above route described in examples 2-5 is given in FIG. 2.

EXAMPLE 6

In a 2.5 liter jacketed glass reactor, a mixture of 55 g butylmethacrylate (BMA) (purity above 99%), 2200 g water of a conductivity of 18.2 M·cm and 0.6 g of a commercial sodium alpha-olefin sulfonate RCH=CH(CH2)nSO$_3$Na (n=12-14) from Stepan Company (Northfield, Ill., United States) are mixed and degassed under nitrogen while stirring at 500 rpm (using a double bladed stirrer). In order to reduce the chain length of the polymer, by controlling the micelle size of the BMA droplets in water, from 1 to 2% by weight of surfactant (e.g. sodium alpha-olefin sulfonate) is added to the monomer mixture. Then the reactor is put under nitrogen and the mixture is heated to 80° C. After addition of the initiator solution (for instance 1.6 g ammonium persulfate 98% in 50 g of water of a conductivity of 18.2 M·cm) at 80° C., the stirring speed is reduced to 350 rpm. Polymerisation is carried out for at least 3 hours.

EXAMPLE 7

In this example the commercial silicone elastomer Elastosil LR 3003/5 (commercially available from Wacker Silicones, Germany) was used as the silicone precursor material. The silicone precursor material is a two component system that was normally mixed in a 1:1 weight ratio of two components A and B. The A component consists of a silicone pre-polymer bearing reactive vinyl groups and a platinum catalyst. The B component consists of a silicone pre-polymer bearing reactive vinyl groups and a pre-polymer bearing Si—H groups. A commercial sodium alpha-olefin sulfonate RCH=CH(CH$_2$)$_n$SO$_3$Na (n=12-14) from Stepan Company (Northfield, Ill., United States) was used. 12 g of this very fine powder (particle sizes below 400 µm) was mixed with 7 g of an ethanol water mixture (50/50% by volume). Then 19 g of the A component of the silicone precursor material was added and mixed with a speed mixer. After mixing the ethanol and water were removed under vacuum at 60° C. until a small amount (±0.5 gram) of water was still present. Then silicone precursor B component (24.7 g) was added and the obtained composition was mixed. The commercial sodium $C_{12-14}$ alkenyl sulfonate added to the silicone precursors A+B, is thus amounting to 27.5 weight % of silicone precursor (A+B) weight ((weight sodium C12-14 alkenyl sulfonate/weight silicone A+B)*100). The mixing ratio of this system for component A to B was 1 to 1.3. Material samples were prepared by pressure molding at 130° C. for 10 to 15 minutes at 711 psi.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A rubbery or elastomeric polymer material taking up more than 5% by weight of water and up to 500% by weight, of water after immersion in demineralized water at room temperature for a sufficient time to reach saturation, comprising:
    (a) repeating units from one or more hydrophobic organic monomers,
    (b) repeating units from one or more monomers (a) being modified with one or more hydrophilic side groups, and
    (c) a ligand, wherein said hydrophilic side groups are $C_{3-28}$ alkylsulfonate groups in association with a cation, and wherein said cation is a monovalent cation selected from the group consisting of ammonium and Li, Na and K cations, or a divalent cation selected from the group consisting of Ca and Mg.

2. A rubbery or elastomeric polymer material according to claim 1, wherein said hydrophobic organic monomer (a) is selected from the group consisting of butadiene, isoprene, dialkylsiloxanes, diarylsiloxanes, acrylic acid alkyl esters, acrylonitrile, chloroprene, fluorinated ethylene, mixtures of ethylene and vinyl acetate, mixtures of ethylene and one or more acrylic acid esters, and mixtures of ethylene with propylene and a diene.

3. A rubbery or elastomeric polymer material according to claim 1, wherein said hydrophobic organic monomer (a) is a dialkylsiloxane or a diarylsiloxane, and wherein the total number of repeating units (a) and repeating units (b) is a least 5 and less than 1,000.

4. A rubbery or elastomeric polymer material according to claim 1, being in the form of a coating adapted for adhesion to a substrate, or being in the form of a foam with a foam density from 60 to 300 kg/m$^3$.

5. A rubbery or elastomeric polymer material according to claim 1, being in the form of a fiber or of a sheet.

* * * * *